(12) United States Patent
Schaefers

(10) Patent No.: US 8,931,764 B2
(45) Date of Patent: Jan. 13, 2015

(54) AIR SPRING

(71) Applicant: ContiTech Luftfedersysteme GmbH, Hannover (DE)

(72) Inventor: Dominik Schaefers, Hannover (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 23 days.

(21) Appl. No.: 13/762,063

(22) Filed: Feb. 7, 2013

(65) Prior Publication Data

US 2013/0147100 A1 Jun. 13, 2013

Related U.S. Application Data

(63) Continuation of application No. PCT/EP2011/059662, filed on Jun. 10, 2011.

(30) Foreign Application Priority Data

Aug. 13, 2010 (DE) .......................... 10 2010 036 972

(51) Int. Cl.
*F16F 9/04* (2006.01)
*F16F 9/05* (2006.01)

(52) U.S. Cl.
CPC ................. *F16F 9/05* (2013.01); *F16F 9/0454* (2013.01); *F16F 9/057* (2013.01)
USPC ...................................................... 267/64.24

(58) Field of Classification Search
USPC ............. 267/64.19, 64.21, 64.23, 64.24, 120, 267/124
See application file for complete search history.

(56) References Cited

U.S. PATENT DOCUMENTS

| | | | | |
|---|---|---|---|---|
| 3,549,142 A | * | 12/1970 | Tilton | 267/64.24 |
| 3,596,895 A | * | 8/1971 | Hirtreiter | 267/64.24 |
| 5,382,006 A | * | 1/1995 | Arnold | 267/64.27 |
| 2008/0246198 A1 | | 10/2008 | Levy et al. | |

FOREIGN PATENT DOCUMENTS

| | | |
|---|---|---|
| DE | 1 285 792 B | 12/1968 |
| DE | 41 15 028 A1 | 11/1992 |
| DE | 10 2008 055 511 A1 | 6/2010 |
| EP | 0451749 * | 4/1991 |
| GB | 1001515 A | 8/1965 |

OTHER PUBLICATIONS

International Search Report dated Sep. 20, 2011 of international application PCT/EP2011/059662 on which this application is based.

* cited by examiner

*Primary Examiner* — Christopher Schwartz
(74) *Attorney, Agent, or Firm* — Walter Ottesen P.A.

(57) ABSTRACT

An air spring has a rolling-lobe flexible member terminating in a conically-shaped bead defining a conically-shaped opening of the flexible member. A-roll-off piston has an end facing toward the flexible member and has a conical seat formed thereon for receiving the bead of the flexible member to conjointly define therewith an airtight force fit connection. The roll-off piston further has a support shoulder beneath the conical seat whereon the flexible member is supported when deflected and the roll-off piston has an annular groove formed therein between the end thereof and the conical seat. An annular locking member is seatable in the annular groove after assembly of the flexible member on the conical seat so as to hinder the bead from slipping off of the conical seat.

8 Claims, 5 Drawing Sheets

AIR SPRING

CROSS REFERENCE TO RELATED APPLICATIONS

This application is a continuation application of international patent application PCT/EP2011/059662, filed Jun. 10, 2011, designating the United States and claiming priority from German application 10 2010 036 972.1, filed Aug. 13, 2010, and the entire content of both applications is incorporated herein by reference.

FIELD OF THE INVENTION

The invention relates to an air spring having, a rolling-lobe flexible member defining a conically-shaped opening which has a bead reinforced by a core. The air spring also includes a roll-off piston having a conical seat and a supporting shoulder for supporting the rolling-lobe flexible member. In a mounted state, the rolling-lobe flexible member is connected at a first end to the conical seat of the roll-off piston in an airtight manner by a conical force fit connection. In a deflected state of the air spring, the rolling-lobe flexible member is supported on the supporting shoulder with respect to the roll-off piston.

BACKGROUND OF THE INVENTION

Air springs of this type are used predominantly in commercial vehicles, but also increasingly in trailers. Here, the leading of the air spring is usually a pressure loading, with the result that the conical farce fit connection affords high reliability.

If, however, pronounced rebound occurs, which can come about, in particular, during the loading of trailers, for example onto rail cars, the conical force fit connection is also subjected to a tensile load. A separation of the conical force fit connection can occur here in unfavorable cases.

DE 1 285 792 B describes an air spring, in which separation of the conical force fit is counteracted by fastening discs, which are attached by threaded fasteners. However, this arrangement necessitates a somewhat complicated assembly if a plurality of discs is used. Secondly, the conical force fit connection is secured correspondingly only at a single point, which still permits a local separation of the conical force fit connection in the case of tensile loading.

DE 4 115 028 A1 proposes to improve the conical seat by means of threaded portions. Although, as a result of the threaded portions, the rolling-lobe flexible member is held fixedly on the cone in the case of tensile loading, the rolling-lobe flexible member has to be rotated with respect to the roll-off piston daring assembly. The rotating operation is performed using complicated apparatuses. Moreover, the threaded portions can cut into an elastomeric material of the rolling-lobe flexible member and thus trigger premature failure thereof.

SUMMARY OF THE INVENTION

It is an object of the invention to reliably improve the conical force fit connection in air springs in the case of detaching forces.

This improvement is achieved by virtue of the fact that the roll-off piston has an annular groove, which is arranged spaced apart from a first end of the roll-off piston, which is assigned to the conical seat. The annular groove lies between the first end of the roll-off piston and the conical seat of the roll-off piston and the air spring has a locking ring with a gap. The locking ring is clipped into the groove after the mounting of the rolling-lobe flexible member on the conical seat. The core-reinforced, conical bead of the rolling-lobe flexible member comes to lie between the locking ring and the supporting shoulder and is prevented by a locking ring from sliding off the conical seat of the roll-off piston.

The locking ring has a gap which acts as a circlip and secures the conical force fit connection against unintentional separation. The detaching forces for separating the rolling-lobe flexible member from the roll-off piston are increased significantly in the case of a mounted locking ring. The mounting of the locking ring is simple and is completed in a same operation as pushing the rolling-lobe flexible member bead onto the conical seat. Further work operations or rotational movements of the apparatus are avoided.

BRIEF DESCRIPTION OF THE DRAWINGS

The invention will now foe described with reference to the drawings wherein.

DESCRIPTION OF THE PREFERRED EMBODIMENTS OF THE INVENTION

Figure 1:
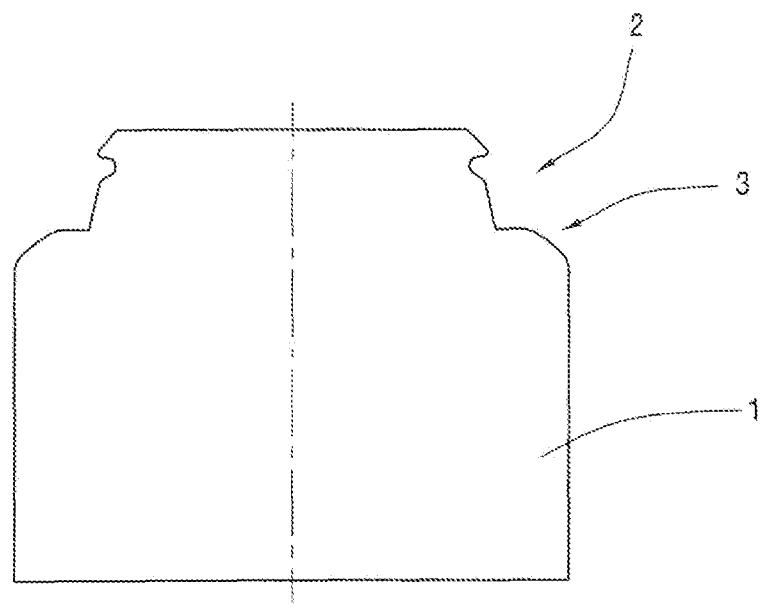
FIG. 1 is a longitudinal view of an air spring roll-off piston.

FIG. 1 is a longitudinal view of a roll-off piston 1. The roll-off piston 1 has a conical seat 2 and a supporting shoulder 3 for a rolling-lobe flexible member (not shown).

Figure 2:
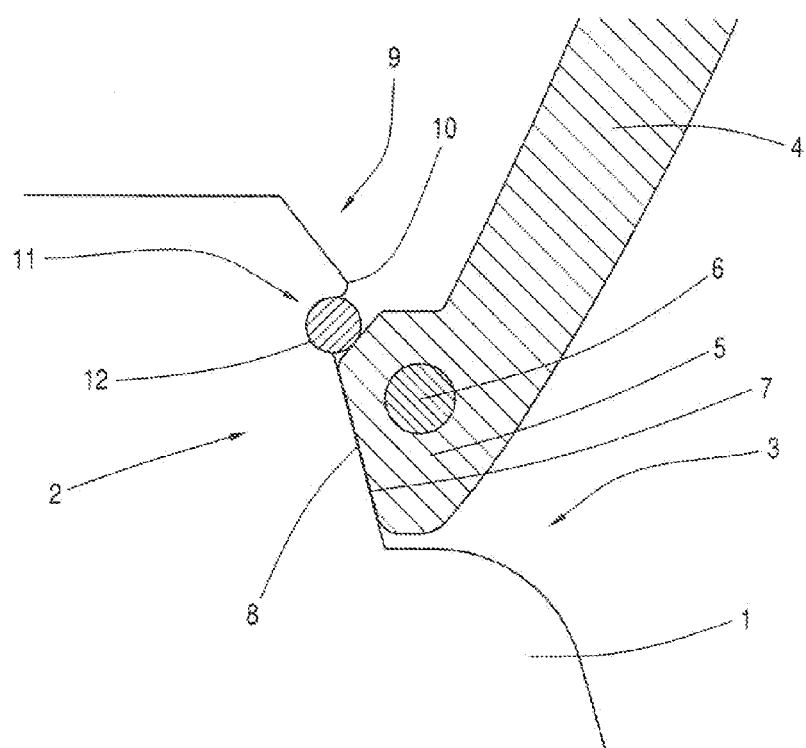
FIG. 2 is a detail cross-sectional view of a rolling-lobe flexible member mounted on the roll-off piston.

FIG. 2 is a detail cross-sectional view showing the rolling-lobe flexible member 4 mounted on the conical seat 2. The rolling-lobe flexible member 4 is made from an elastomeric material. In the position shown, the rolling-lobe flexible member 4 is completely extended, with the result that the flexible member is not supported on the supporting shoulder 3. At an end of the rolling-lobe flexible member 4, which is assigned to the roil-off piston 1, the flexible member has a bead 5, which is reinforced with a metallic core 6. The bead 5 has an opening which corresponds to the conical seat 2 and has a conical sealing face 7. As a result of the elasticity of the elastomer material and the core 6, the conical sealing face 7 forms a connection which seals in an airtight manner with a corresponding conical seat face 8 of the conical seat 2.

Furthermore, the conical seat 2 has a guiding and mounting region 9. The latter serves as a mounting aid while the bead 5 is pressed onto the conical seat 2.

The guiding and mounting region 9 projects radially to the outside with a latching lug 10 in such a way that an outer diameter of the latching lug 10 is slightly greater than a smallest diameter of the conical sealing face 7. This ensures, during the assembly, that the bead 5 does not unintentionally slide off from the conical seat 2. However, the holding forces of the latching lug 10 are low, since the difference in diameter between the latching lug 10 and the sealing face 7 are small to avoid damage of the conical sealing face 7 during assembly.

Figure 5:
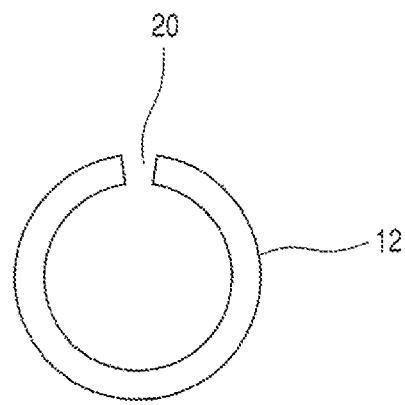

The conical seat 2 therefore has an annular groove 11 between the latching lug 10 of the guiding and mounting region 9 and the conical seat face 8. A toroidal locking ring 12 engages into annular groove 11. The toroidal locking ring 12 is configured from a resilient, metallic material and is divided by way of a gap 20 shown schematically in FIG. 5. As a result, the locking ring 12 is able to be widened and, in a similar manner to a circlip, can be clipped into the annular groove 11 via the guiding and mounting region 9 and the latching lug 10. The toroidal locking ring 12 has an external diameter which is increased with respect to the latching lug 10. The bead 5 of the rolling-lobe flexible member 4 is therefore fixed between the toroidal locking ring 12 and the supporting shoulder 3 and is secured against being pulled off from the conical seat face 8.

Figure 3:
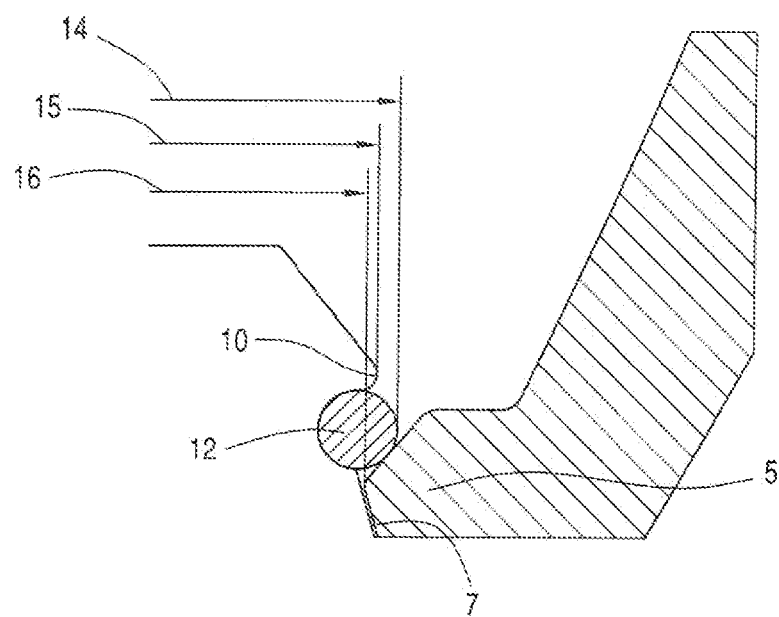
FIG. 3 is a detail cross-sectional view of diameter proportions on the air spring according to one or more embodiments of the air spring of the invention.

In FIG. 3, the diameter proportions are explained in greater detail. An external diameter 14 of the toroidal locking ring 12 is greater than an external diameter 15 of the latching lug 10 and is therefore also greater than an internal diameter 16 of the conical sealing face 7 of the bead 5.

Figure 4:
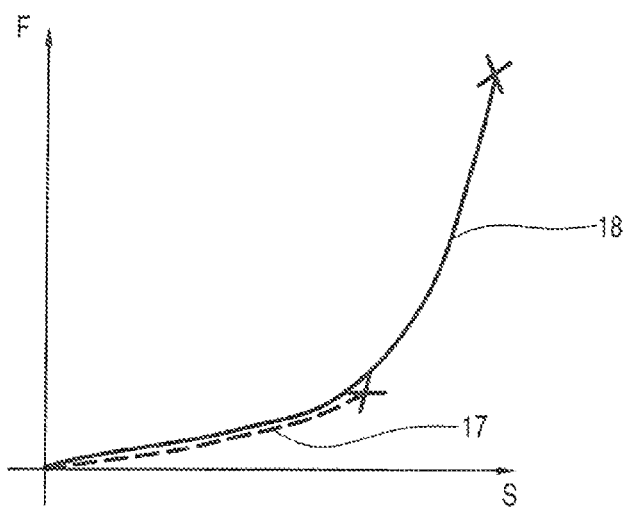
FIG. 4 is a graph of detaching force-displacement profiles of the air spring with and without a locking ring according to one or more embodiments of the invention; and, FIG. 5 is a schematic showing the gap in the annular locking ring.

FIG. 4 is a graph of detaching force-displacement profiles of the detaching forces of the rolling-lobe flexible member from the conical seat with and without the locking ring. A dashed curve 17 shows the profile of a detaching force F versus a detaching height S without a locking ring. The solid line curve 18 shows the detaching force W versus the detaching height S with the locking ring. The detaching force F according to curve 18 reaches higher values. The detaching height S which corresponds to the rebound travel of an air spring is considerably greater according to curve 18 with the locking ring than curve 17 without the locking ring. The security against the rolling-lobe flexible member 4 being pulled off from the conical seat 2 of the roll-off piston 1 is apparent to one of ordinary skill in the art.

It is understood that the foregoing description is that of the preferred embodiments of the invention and that various changes and modifications may foe made thereto without departing from the spirit and scope of the invention as defined in the appended claims.

LIST OF DESIGNATIONS (Part of the Description)

1 Roll-off piston
2 Conical seat
3 Supporting shoulder
4 Rolling-lobe flexible member
5 Bead of the rolling-lobe flexible member 4
6 Core of the bead 5
7 Sealing face of the bead 5
8 Seat face of the conical seat 2
9 Guiding and mounting region
10 Latching lug
11 Annular groove
12 Locking ring
14 External diameter of the locking ring 12
15 External diameter of the latching lug 11
16 Smallest internal diameter of the sealing face 7
17 Force-displacement curve without locking ring
18 Force-displacement curve with locking ring
20 Gap in locking ring

What is claimed is:

1. An air spring comprising:
a rolling-lobe flexible member terminating in a conically-shaped bead defining a conically-shaped opening of said flexible member;
said conically-shaped bead having an innermost diameter at said conically-shaped opening;
a roll-off piston having an end facing toward said flexible member and having a conical seat formed thereon in spaced relationship to said end for receiving said bead of said flexible member thereon to conjointly define therewith an airtight force fit connection when said air spring is in the assembled state;
said roll-off piston further having a support shoulder beneath said conical seat whereon said flexible member is supported in the deflected state of said air spring;
said roll-off piston having an annular groove formed therein between said end of said roll-off piston and said conical seat so as to leave an annular space at said conical seat between said annular groove and said support shoulder;
said bead resting on said conical seat in said annular space between said annular groove and said support shoulder when said flexible member is mounted on said roll-off piston; and,
an annular locking member having a diameter greater than said innermost diameter of said conically-shaped bead and being seated in said annular groove and extending radially outwardly beyond said innermost diameter so as to hinder said bead from slipping off of said conical seat.

2. The air spring of claim 1, wherein said bead incorporates a reinforcement core therein.

3. The air spring of claim 2, wherein said reinforcement core comprises metal.

4. The air spring of claim 2, wherein said annular locking member has a gap to facilitate clipping the same into said annular groove.

5. The air spring of claim 2, wherein said core comprises metal.

6. An air spring comprising:
a rolling-lobe flexible member terminating in a conically-shaped bead defining a conically-shaped opening of said flexible member;
a roll-off piston having an end facing toward said flexible member and having a conical seat formed thereon in spaced relationship to said end for receiving said bead of said flexible member thereon to conjointly define therewith an airtight force fit connection when said air spring is in the assembled state;
said roll-off piston further having a support shoulder beneath said conical seat whereon said flexible member is supported in the deflected state of said air spring;
said roll-off piston having an annular groove formed therein between said end thereof and said conical seat;
said bead resting between said annular groove and said support shoulder when said flexible member is mounted on said roll-off piston;
an annular locking member seated in said annular groove so as to hinder said bead from slipping off of said conical seat;
said bead incorporating a reinforcement core therein;
said annular locking member having a gap to facilitate clipping the same into said annular groove; and,
said annular locking member comprising a resilient metallic material.

7. The air spring of claim 1, said roll-off piston having a radially outwardly projecting lug formed thereon.

8. An air spring comprising:
a rolling-lobe flexible member terminating in a conically-shaped bead defining a conically-shaped opening of said flexible member;
a roll-off piston having an end facing toward said flexible member and having a conical seat formed thereon in spaced relationship to said end for receiving said bead of said flexible member thereon to conjointly define therewith an airtight force it connection when said air spring is in the assembled state;

said roll-off piston further having a support shoulder beneath said conical seat whereon said flexible member is supported in the deflected state of said air spring;

said roll-off piston having an annular groove formed therein between said end thereof and said conical seat;

said bead resting between said annular groove and said support shoulder when, said flexible member is mounted on said roll-off piston;

an annular locking member seated in said annular groove so as to hinder said bead from slipping off of said conical seat;

said roll-off piston having a radially outwardly projectinq lug formed thereon; and, the external diameter of said annular locking member being greater than the external diameter of said projecting lug and greater than the smallest internal diameter of said conically-shaped opening of said flexible member.

* * * * *

UNITED STATES PATENT AND TRADEMARK OFFICE
CERTIFICATE OF CORRECTION

PATENT NO. : 8,931,764 B2
APPLICATION NO. : 13/762063
DATED : January 13, 2015
INVENTOR(S) : Dominik Schaefers It is certified that error appears in the above-identified patent and that said Letters Patent is hereby corrected as shown below:

Title Page:
Under (57) Abstract: delete "A-roll-off" and substitute -- A roll-off -- therefor in the third line.

In the Specification:
In Column 1:
Line 30: delete "lead-" and substitute -- load- -- therefor.
Line 32: delete "farce" and substitute -- force -- therefor.
Line 52: delete "daring" and substitute -- during -- therefor.

In Column 2:
Line 20: delete "foe" and substitute -- be -- therefor.
Line 47: delete "roil-off" and substitute -- roll-off -- therefor.

In Column 3:
Line 23: delete "force W" and substitute -- force F -- therefor.
Line 34: delete "foe" and substitute -- be -- therefor.

In the Claims:
In Column 5:
Line 2, Claim 8: delete "it" and substitute -- fit -- therefor.

Signed and Sealed this
Fourth Day of August, 2015

Michelle K. Lee
*Director of the United States Patent and Trademark Office*